United States Patent
Kama et al.

(10) Patent No.: US 10,745,075 B2
(45) Date of Patent: Aug. 18, 2020

(54) TRAVELING APPARATUS

(71) Applicant: TOYOTA JIDOSHA KABUSHIKI KAISHA, Toyota-shi, Aichi-ken (JP)

(72) Inventors: Takeshi Kama, Nagakute (JP); Makoto Mori, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 299 days.

(21) Appl. No.: 15/673,610

(22) Filed: Aug. 10, 2017

(65) Prior Publication Data

US 2018/0065700 A1 Mar. 8, 2018

(30) Foreign Application Priority Data

Sep. 7, 2016 (JP) ................................ 2016-174870

(51) Int. Cl.
*B62K 11/14* (2006.01)
*B62K 21/22* (2006.01)
(Continued)

(52) U.S. Cl.
CPC .............. *B62K 11/14* (2013.01); *B62K 3/002* (2013.01); *B62K 5/027* (2013.01); *B62K 15/006* (2013.01);
(Continued)

(58) Field of Classification Search
CPC ............ B60G 2300/40; B60G 2300/37; B60G 2300/12; B60W 2300/46; B60Y 2200/43;
(Continued)

(56) References Cited

U.S. PATENT DOCUMENTS 4,613,151 A * 9/1986 Kielczewski .......... A61G 5/042
180/216
4,794,999 A * 1/1989 Hester .................... A61G 5/061
180/8.2
(Continued)

FOREIGN PATENT DOCUMENTS

JP 1-106717 A 4/1989
JP 2005112300 A * 4/2005
(Continued)

OTHER PUBLICATIONS

Pages 002-003 and front/rear cover of Midnight Club II user guide for Xbox obtained from https://archive.org/details/xboxmanual_Midnight_Club_2 (Year: 2003).*
(Continued)

*Primary Examiner* — James A Shriver, II
*Assistant Examiner* — Vaughn Coolman
(74) *Attorney, Agent, or Firm* — Sughrue Mion, PLLC

(57) ABSTRACT

A traveling apparatus includes: an operation member configured to be displaced to a first range and a second range; an adjusting mechanism configured to adjust a wheel base length between a front wheel and a rear wheel in such a way that the wheel base length is increased when the user displaces the operation member in a direction away from a reference position in the first range; and a controller configured to control, when the user manipulates the operation member in the first range, a driving unit in such a way that the traveling apparatus travels forward based on a forward movement target speed that has been made to become larger as the wheel base length increases, in which the controller controls the driving unit in such a way that the traveling apparatus travels backward when the user manipulates the operation member in the second range.

10 Claims, 15 Drawing Sheets

(51) Int. Cl.
*B62K 5/027* (2013.01)
*B62K 15/00* (2006.01)
*B62K 3/00* (2006.01)
*B62K 21/14* (2006.01)

(52) U.S. Cl.
CPC .......... *B62K 21/22* (2013.01); *B62K 2204/00* (2013.01); *Y02T 10/7258* (2013.01)

(58) Field of Classification Search
CPC .................... B60K 7/00; B60K 7/0007; B60K 2007/0038; B60K 2007/0092
See application file for complete search history.

(56) References Cited

U.S. PATENT DOCUMENTS

| | | | | |
|---|---|---|---|---|
| 6,374,934 | B1* | 4/2002 | Beck | B62D 63/02 180/65.51 |
| D483,821 | S* | 12/2003 | Yang | D12/112 |
| 7,182,166 | B2* | 2/2007 | Gray | A61G 5/045 180/209 |
| D586,265 | S* | 2/2009 | Lin | D12/111 |
| 7,717,200 | B2* | 5/2010 | Kakinuma | A63C 17/08 180/218 |
| 7,717,210 | B2* | 5/2010 | Mahy | A61G 5/046 180/209 |
| 8,050,820 | B2* | 11/2011 | Yanaka | B60G 3/01 180/41 |
| D650,724 | S* | 12/2011 | Chiang | D12/111 |
| 8,894,088 | B2* | 11/2014 | Lark, Jr. | B62D 21/14 280/639 |
| 9,205,889 | B2* | 12/2015 | Paick | B62M 6/60 |
| 9,873,476 | B2* | 1/2018 | Etzelsberger | B62K 15/006 |
| 9,889,872 | B2* | 2/2018 | Somerset | B62B 7/008 |
| D827,035 | S* | 8/2018 | Delgatty | D21/423 |
| 10,150,528 | B2* | 12/2018 | Kano | B62K 5/06 |
| 2006/0108156 | A1* | 5/2006 | Heinzmann | B60L 15/2036 180/8.2 |
| 2008/0116665 | A1* | 5/2008 | Nakaizumi | B62D 21/14 280/638 |
| 2008/0295595 | A1* | 12/2008 | Tacklind | A61G 5/14 73/462 |
| 2009/0260901 | A1 | 10/2009 | Ishii et al. | |
| 2012/0012413 | A1* | 1/2012 | Tsai | B62K 3/005 180/209 |
| 2012/0101703 | A1* | 4/2012 | Morita | A61G 5/041 701/70 |
| 2013/0015633 | A1* | 1/2013 | Nakabayashi | B62K 25/283 280/281.1 |
| 2014/0008138 | A1 | 1/2014 | Kim et al. | |
| 2015/0042053 | A1* | 2/2015 | Berndorfer | B62K 3/002 280/7.1 |
| 2015/0068828 | A1* | 3/2015 | Delgatty | B62K 5/06 180/210 |
| 2016/0083039 | A1* | 3/2016 | Delgatty | B62K 5/06 180/65.51 |
| 2017/0259871 | A1* | 9/2017 | Delgatty | B62K 5/06 |
| 2018/0022412 | A1* | 1/2018 | Etzelsberger | B62J 1/02 180/208 |
| 2018/0338877 | A1* | 11/2018 | Kano | A61G 5/047 |

FOREIGN PATENT DOCUMENTS

| | | |
|---|---|---|
| JP | 2005-231415 A | 9/2005 |
| JP | 2009255840 A | 11/2009 |
| JP | 2010-167809 A | 8/2010 |
| JP | 2010173356 A | 8/2010 |
| JP | 5316640 B2 | 10/2013 |

OTHER PUBLICATIONS

Machine translation of Description section of JP 2005112300 A obtained from espacenet.com on Sep. 9, 2019 (Year: 2005).*

* cited by examiner

| ROTATION ANGLE θ (DEGREE) | $\theta_{MIN}-\theta_1$ | $\theta_1-\theta_2$ | $\theta_2-\theta_{RP}-\theta_3$ | $\theta_3-\theta_4$ | $\theta_4-\theta_5$ | $\theta_5-\theta_{MAX}$ |
|---|---|---|---|---|---|---|
| TARGET SPEED (km/h) | 4.0 | 2.0 | 0 | 5.0 | 10.0 | 15.0 |

◄──── BACKWARD MOVEMENT ────►  ◄── STOP ──►  ◄──── FORWARD MOVEMENT ────►

Fig. 9

TRAVELING APPARATUS

CROSS REFERENCE TO RELATED APPLICATIONS

This application is based upon and claims the benefit of priority from Japanese patent application No. 2016-174870, filed on Sep. 7, 2016, the disclosure of which is incorporated herein in its entirety by reference.

BACKGROUND

Nowadays, personal mobility vehicles have been attracting attention. A personal mobility vehicle is often manufactured in a small size in view of maneuverability, which raises a problem that it lacks stability when traveling at a high speed. In order to improve stability of vehicles, including personal mobility vehicles but not limited thereto, vehicles having adjustable wheel base lengths have been suggested (e.g., Japanese Unexamined Patent Application Publication Nos. H1-106717 and 2005-231415).

SUMMARY

In personal mobility vehicles, various techniques including adjustable wheel base lengths have been proposed for forward traveling, whereas not many techniques for backward traveling have been proposed. Even if the techniques for backward traveling are proposed, an operation system for the backward traveling is independent from an operation system for the forward traveling and thus it is difficult for a user to instinctively learn the driving operation.

The present invention has been made to solve such a problem and provides a traveling apparatus that can be made to travel either forward or backward by an instinctive user interface and achieves both good maneuverability when traveling at a low speed and stability when traveling at a high speed.

A traveling apparatus according to one aspect of the present invention includes at least, with respect to a traveling direction, a front wheel and a rear wheel and on which a user rides when traveling, the traveling apparatus including: a driving unit configured to drive at least one of the front wheel and the rear wheel; an operation member configured to be displaced to a first range which is on one side with respect to a reference position and a second range which is on another side with respect to the reference position; an adjusting mechanism configured to adjust a wheel base length between the front wheel and the rear wheel in such a way that the wheel base length is increased when the user displaces the operation member in a direction away from the reference position in the first range; and a controller configured to control, when the user manipulates the operation member in the first range, the driving unit in such a way that the traveling apparatus travels forward based on a forward movement target speed that has been made to become larger as the wheel base length increases, in which the controller controls the driving unit in such a way that the traveling apparatus travels backward when the user manipulates the operation member in the second range.

According to the aforementioned configuration, it is possible to achieve the instinctive user interface in which when the operation member is manipulated in one direction from the reference position, the traveling apparatus travels forward in such a way that the speed increases in accordance with the degree of manipulation and when the same operation member is manipulated in the opposite direction from the reference position, the traveling apparatus travels backward. Further, at least the forward movement operation is directly coupled to the adjustment of the wheel base length and good maneuverability when traveling at a low speed and stability when traveling at a high speed can be achieved by a simple driving operation.

According to the present invention, it is possible to provide a traveling apparatus that can be made to travel wither forward or backward by an instinctive user interface and achieves both good maneuverability when traveling at a low speed and stability when traveling at a high speed.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 9 is a table showing a relationship between the rotation angle and the target speed according to another example;

DESCRIPTION OF EMBODIMENTS

Hereinafter, although the present invention will be described with reference to embodiments of the invention, the invention according to claims is not limited to the following embodiments. Moreover, all the components described in the following embodiments are not necessarily indispensable for means to solve problems.

Figure 1:
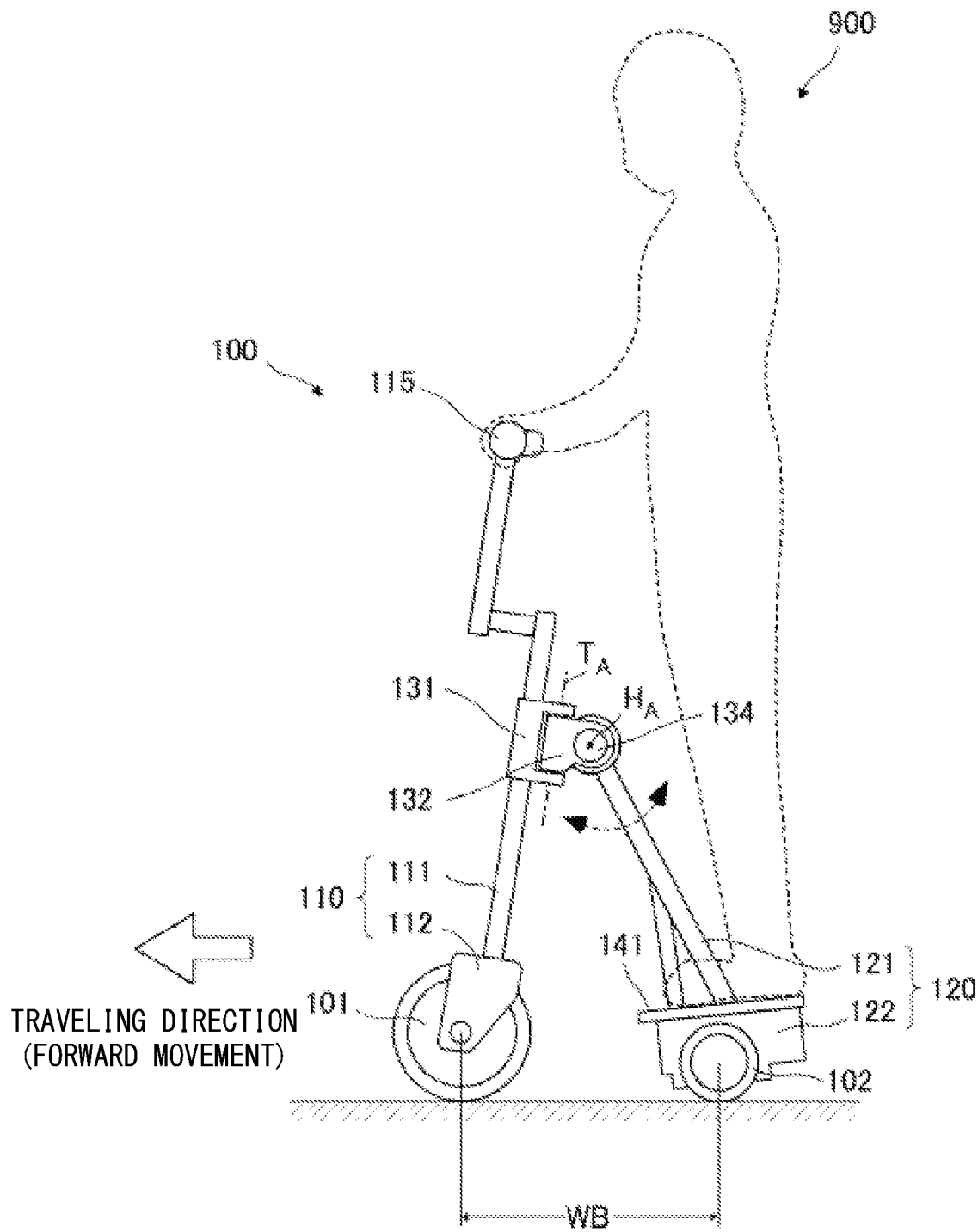
FIG. 1 is a lateral overview diagram of a traveling apparatus according to a first embodiment when it travels at a low speed.
Figure 2:
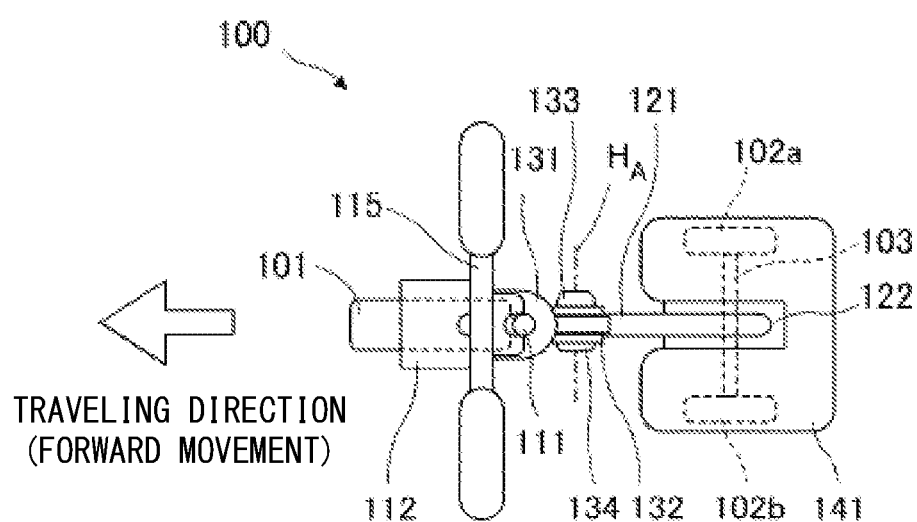
FIG. 2 is a top overview diagram of the traveling apparatus.

A first embodiment will be explained. FIG. 1 is a lateral overview diagram of a traveling apparatus 100 according to the first embodiment when it travels at a low speed. FIG. 2 is a top overview diagram of the traveling apparatus 100 that is in the state shown in FIG. 1 when the traveling apparatus 100 is viewed from above. In FIG. 2, a user 900, who is illustrated by the dotted line in FIG. 1, is not shown.

The traveling apparatus 100 is one kind of personal mobility vehicle and is an electrically operated mobile vehicle in which a user stands when he or she rides on the traveling apparatus 100. The traveling apparatus 100 includes, with respect to the traveling direction, one front wheel 101 and two rear wheels 102 (right rear wheel 102a and left rear wheel 102b). An orientation of the front wheel 101 is changed when the user 900 operates a handlebar 115. The front wheel 101 functions as a steering wheel. The right rear wheel 102a and the left rear wheel 102b are coupled to each other via a wheel axis 103. They are driven by a motor (not shown) and a deceleration mechanism and serve as driving wheels. The traveling apparatus 100 is grounded at three points by the three wheels and is a statically stable vehicle that is self-supported even when the traveling apparatus 100 is parked without the user 900 riding thereon.

The front wheel 101 is rotatably supported by a front wheel supporting member 110. The front wheel supporting member 110 includes a front pole 111 and a fork 112. The fork 112 is fixed to one end of the front pole 111 and sandwiches the front wheel 101 to rotatably support the front wheel 101 on both of its sides. The handlebar 115 is extended in the rotation axis direction of the front wheel 101 and fixed to the other end of the front pole 111. When the user 900 turns the handlebar 115, the front pole 111 sends a force of the operation to the front wheel 101 to change its orientation.

The rear wheels 102 are rotatably supported by a rear wheel supporting member 120. The rear wheel supporting member 120 includes a rear pole 121 and a body part 122. The body part 122 fixes and supports one end of the rear pole 121. Further, the body part 122 rotatably supports the right rear wheel 102a and the left rear wheel 102b via the wheel axis 103. The body part 122 also functions as a housing that accommodates the aforementioned motor, the deceleration mechanism, and a battery etc. that supplies power to the motor. A step 141, for the user 900 to place his or her feet on, is provided on the upper surface of the body part 122.

The front wheel supporting member 110 and the rear wheel supporting member 120 are coupled to each other via a pivot joint 131 and a hinge joint 132. The pivot joint 131 is fixed to the front pole 111 that constitutes the front wheel supporting member 110 at a position near the other end of the front pole 111 to which the handlebar 115 is fixed. Further, the pivot joint 131 is pivotally arranged on the hinge joint 132 and rotates in relation to the hinge joint 132 around a pivot axis $T_A$, which is disposed parallel to the direction in which the front pole 111 is extended. The hinge joint 132 is pivotally arranged on one end of the rear pole 121, which constitutes the rear wheel supporting member 120, that is opposite to an end of the rear pole 121 supported by the body part 122. The hinge joint 132 rotates in relation to the rear pole 121 around a hinge axis $H_A$, which is disposed parallel to the direction in which the wheel axis 103 is extended.

With such a structure, when the user 900 turns the handlebar 115, the front wheel supporting member 110 revolves around the pivot axis $T_A$ with respect to the rear wheel supporting member 120, so that the orientation of the front wheel 101 can be changed. Moreover, when the user 900 tilts the handlebar 115 forward with respect to the traveling direction, the motion by the user 900 causes rotation of the front wheel supporting member 110 and the rear wheel supporting member 120 in relation to each other around the hinge axis $H_A$, so that an angle formed by the front pole 111 and the rear pole 121 can be made smaller. When the angle formed by the front pole 111 and the rear pole 121 is made small, a WB length, which is a distance of a wheel base (WB) between the front wheel 101 and the rear wheels 102 becomes shorter. On the contrary, when the user 900 tilts the handlebar 115 backward with respect to the traveling direction, the front wheel supporting member 110 and the rear wheel supporting member 120 rotate in relation to each other around the hinge axis $H_A$, so that the angle formed by the front pole 111 and the rear pole 121 can be made larger. When the angle formed by the front pole 111 and the rear pole 121 increases, the WB length increases. That is, the user 900 is able to decrease or increase the WB length by applying his/her motion as a rotational force.

A biasing spring 133 is provided near the hinge joint 132. The biasing spring 133 is, for example, a torsion spring. The biasing force of the biasing spring 133 acts around the hinge axis $H_A$ and changes the angle formed by the front pole 111 and the rear pole 121 to be equal to a reference rotation angle described later when the user 900 is not in contact with the handlebar 115. On the other hand, the biasing force of the biasing spring 133 is configured in such a degree as to enable the user 900 to easily tilt the handlebar 115 with respect to the traveling direction. Accordingly, the user 900 can adjust the angle formed by the front pole 111 and the rear pole 121 and thus the WB length by changing at least one of a weight on the handlebar 115 and a weight on the step 141. That is, the mechanism that connects the front pole 111 and the rear pole 121 via the hinge joint 132 serves as an adjusting mechanism in which the user 900 adjusts the WB length.

A rotation angle sensor 134 is provided near the hinge joint 132. The rotation angle sensor 134 outputs the angle formed by the front pole 111 and the rear pole 121 around the hinge axis $H_A$. That is, the rotation angle sensor 134 serves as a measurement unit that measures the relative position of the front wheel supporting member 110 and the rear wheel supporting member 120. The rotation angle sensor 134 is, for example, a rotary encoder. An output of the rotation angle sensor 134 is sent to a controller, which will be described later.

Figure 3:
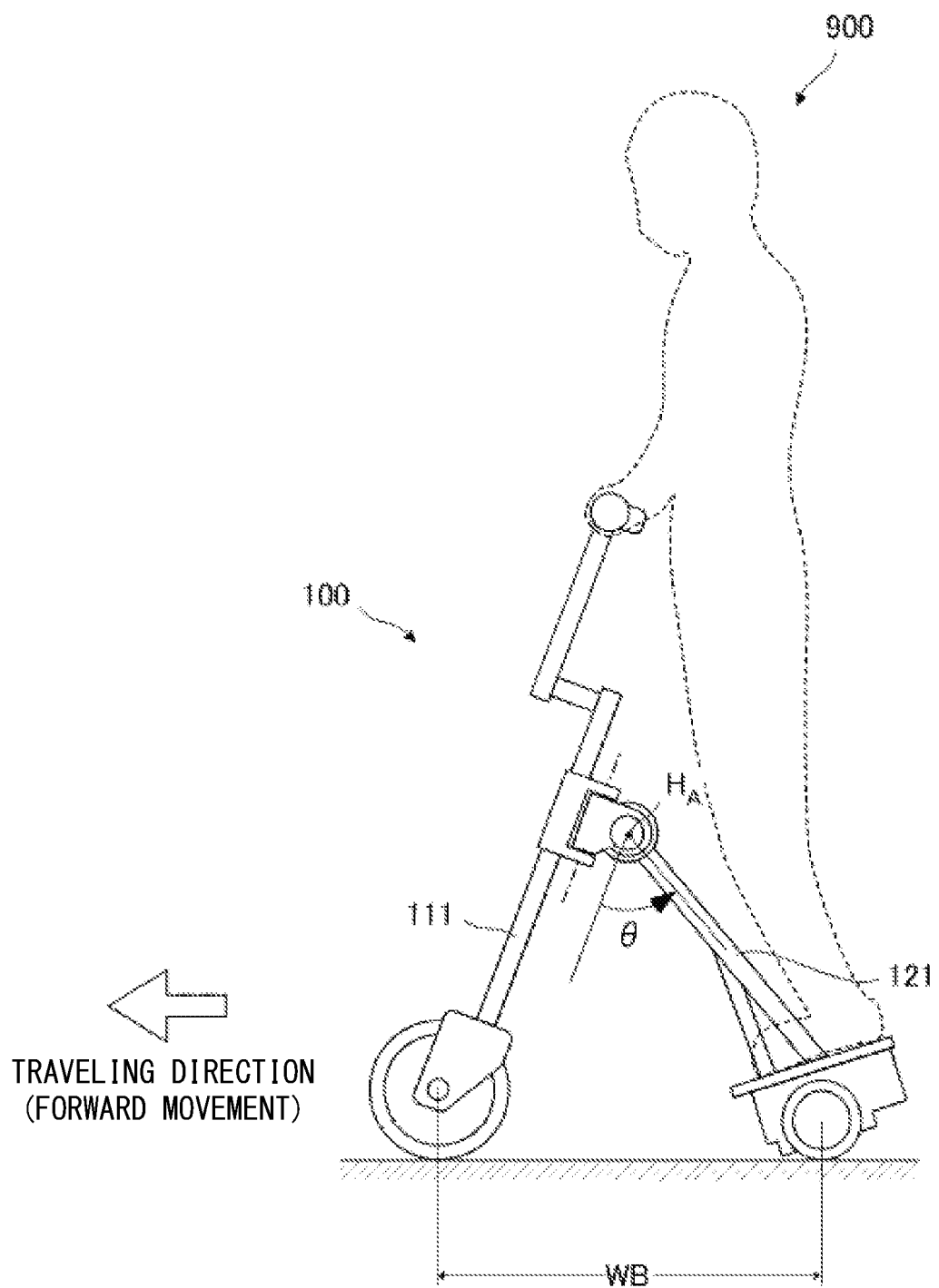
FIG. 3 is a lateral overview diagram of the traveling apparatus when it travels at a high speed.

When traveling forward, the traveling apparatus 100 travels at a low speed when the WB length is short and travels at a high speed when the WB length is long. FIG. 1 shows a state of the traveling apparatus 100 traveling at a low speed with a short WB length. FIG. 3 is a lateral overview diagram of the traveling apparatus 100 shown in FIG. 1 and shows a state of the traveling apparatus 100 traveling at a high speed with a long WB length.

As shown in FIG. 3, a direction in which the angle formed by the front pole 111 and the rear pole 121 relatively increases shall be positive, and a rotation angle shall be θ. The WB length of the traveling apparatus 100 corresponds one-to-one to the rotation angle θ and can be calculated by the function, WB length=f(θ). Therefore, the WB length can be adjusted by changing the rotation angle θ. The traveling apparatus 100 in this embodiment travels forward or backward when the user 900 changes the rotation angle θ and further accelerates/decelerates in order to reach the target speed associated with the changed rotation angle θ.

Figure 4:
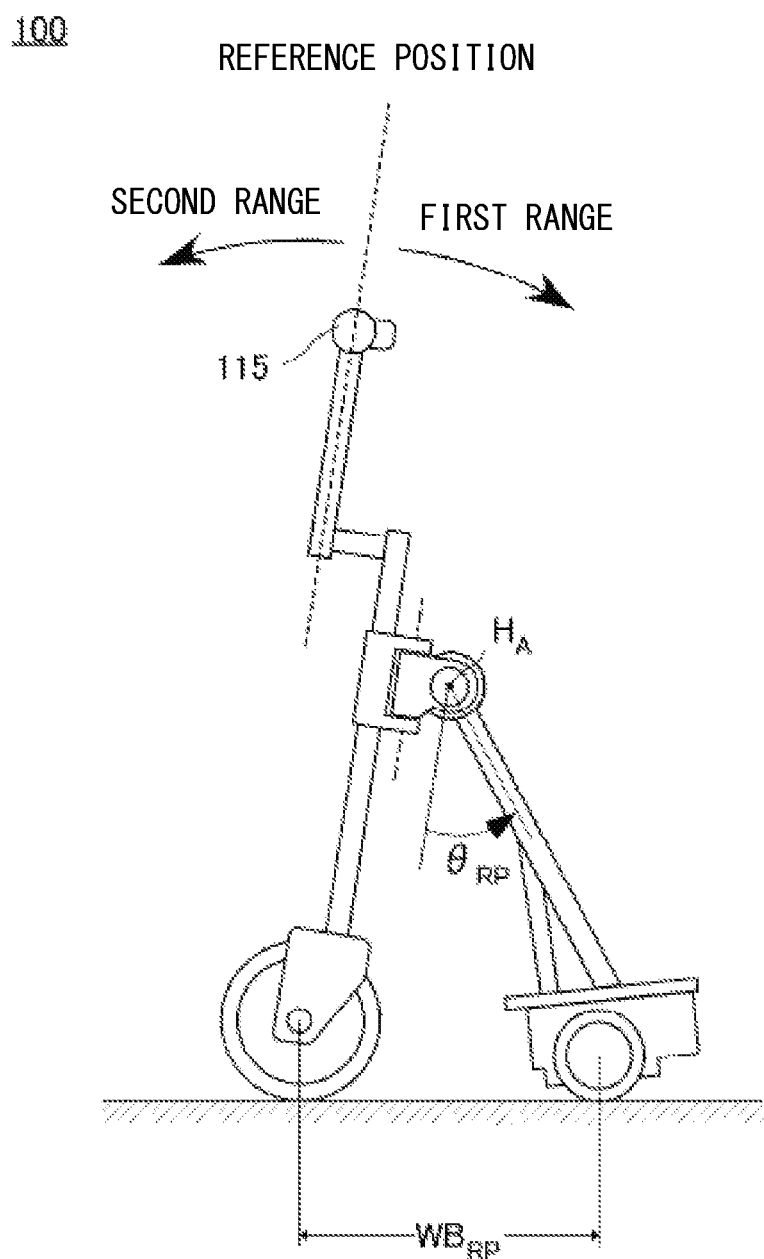
FIG. 4 is a diagram for describing a reference state of the traveling apparatus.

FIG. 4 is a diagram for describing a reference state of the traveling apparatus 100. The reference state of the traveling apparatus 100 is a state in which the rotation angle θ becomes the reference rotation angle $θ_{RP}$. When the minimum value the rotation angle θ can take (minimum angle) is denoted by $\theta_{MIN}$ and the maximum value that the rotation angle θ can take (maximum angle) is denoted by $\theta_{MAX}$, $\theta_{RP}$ is set in such a way that it satisfies $\theta_{MIN}<\theta_{RP}<\theta_{MAX}$. For example, $\theta_{MIN}$ is 20 degrees and $\theta_{MAX}$ is 70 degrees. The WB length corresponding to the reference rotation angle $\theta_{RP}$ is a reference wheel base length $WB_{RP}$.

As described above, the handlebar 115 serves as an operation member to operate the adjusting mechanism and change the WB length. When the position of the handlebar 115 at the reference wheel base length $WB_{RP}$ (that is, at the reference rotation, angle $\theta_R P$) is denoted by a reference position, the user 900 can tilt the handlebar 115 either in, the forward direction or in the backward direction from this reference position. When the user 900 tilts the handlebar 115 backward (that is, to the side where the user 900 is mounted) from the reference position, the rotation angle θ becomes large and the WB length becomes long. The backward manipulation range with respect to the reference position is defined to be a first range. By manipulating the handlebar 115 in the first range, the user 900 is able to change the rotation angle from $\theta_{RP}$ to $\theta_{MAX}$. When the user 900 tilts the handlebar 115 forward from the reference position, the rotation angle θ becomes small and the WB length becomes short. The forward manipulation range with respect to the reference position is defined to be a second range. By manipulating the handlebar 115 in the second range, the user 900 is able to change the rotation angle from $\theta_{RP}$ to $\theta_{MIN}$.

The biasing force of the biasing spring 133 acts to decrease the WB length when the handlebar 115 is manipulated in the first range and acts to increase the WB length when the handlebar 115 is manipulated in the second range. That is, the biasing spring 133 is installed in such a way that the reference state becomes a neutral point.

Figure 5:
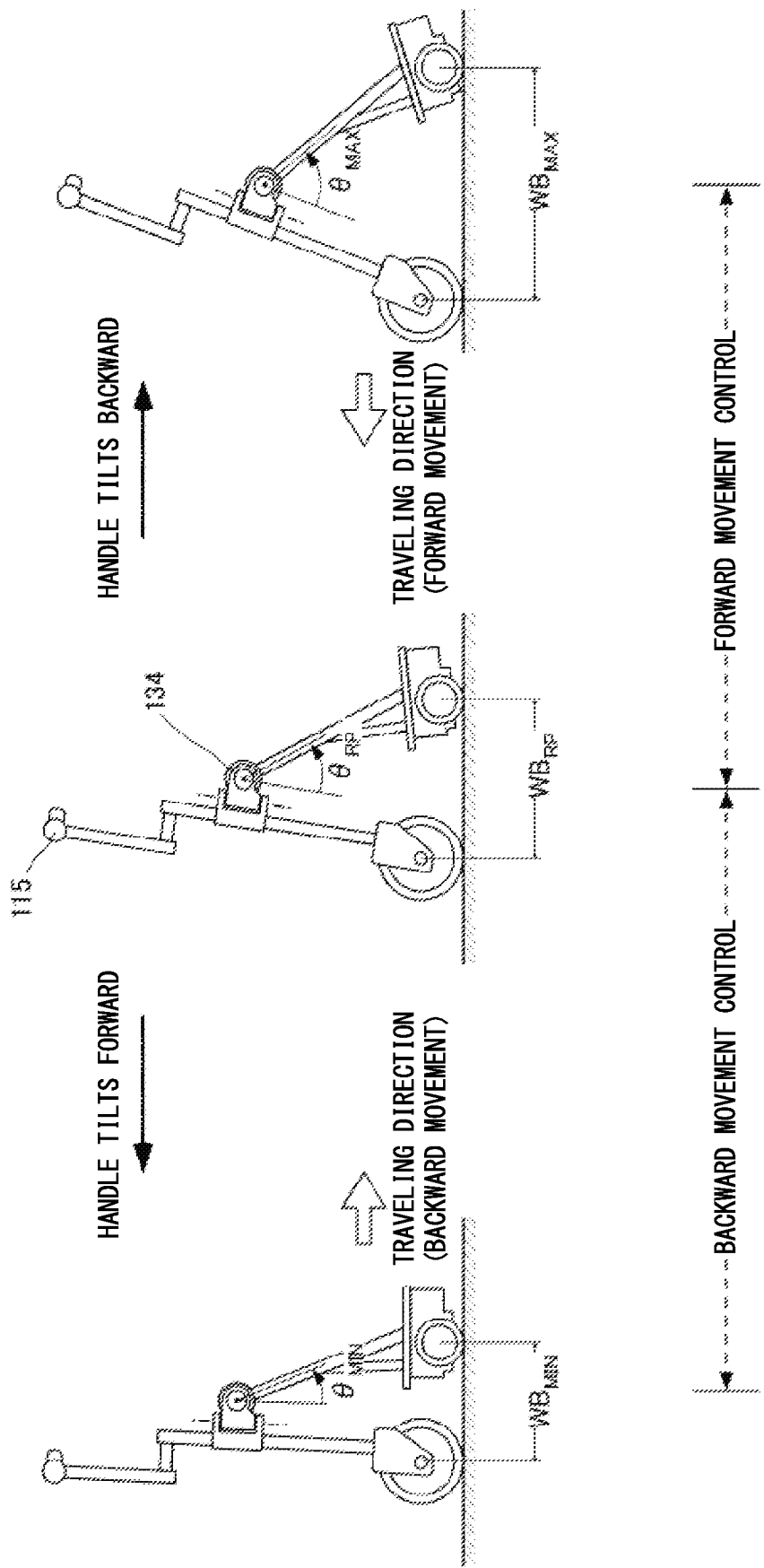
FIG. 5 is a diagram for describing changes in a state of the traveling apparatus and control.

FIG. 5 is a diagram for describing changes in the state of the traveling apparatus 100 and the control. The central traveling apparatus 100 indicates the reference state, the left traveling apparatus 100 indicates the state of $WB_{MIN}$ in which the WB length becomes the shortest, and the right traveling apparatus 100 indicates the state of $WB_{MAX}$ in which the WB length becomes the longest.

The traveling apparatus 100 according to this embodiment travels forward when the user 900 tilts the handlebar 115 backward with respect to the reference position to manipulate it in the first range and travels backward when the user 900 tilts the handlebar 115 forward with respect to the reference position to manipulate it in the second range. The traveling apparatus 100 stops in the reference state. That is, the controller that will be described later refers to the output of the rotation angle sensor 134, performs forward movement control when the rotation angle θ falls within the range between $\theta_{RP}$ and $\theta_{MAX}$, performs backward movement control when the rotation angle θ falls within the range between $\theta_{MIN}$ and $\theta_{RP}$, and performs control to stop the traveling apparatus 100 when the rotation angle θ is $\theta_{RP}$. The specific forward movement control, the backward movement control, and the stop control executed by the controller will be described later.

The reference rotation angle $\theta_R P$ is preferably set to be closer to the minimum angle $\theta_{MIN}$ with respect to the angle at which the range between the minimum angle $\theta_{MIN}$ and the maximum angle $\theta_{MAX}$ is bisected. That is, the degree of manipulation at which the handlebar 115 can be manipulated in the first range may be preferably larger than the degree of manipulation at which the handlebar 115 can be manipulated in the second range. By increasing the degree of manipulation at which the handlebar 115 can be manipulated in the first range, the width of the forward movement control with respect to the WB length can be expanded.

Figure 6:
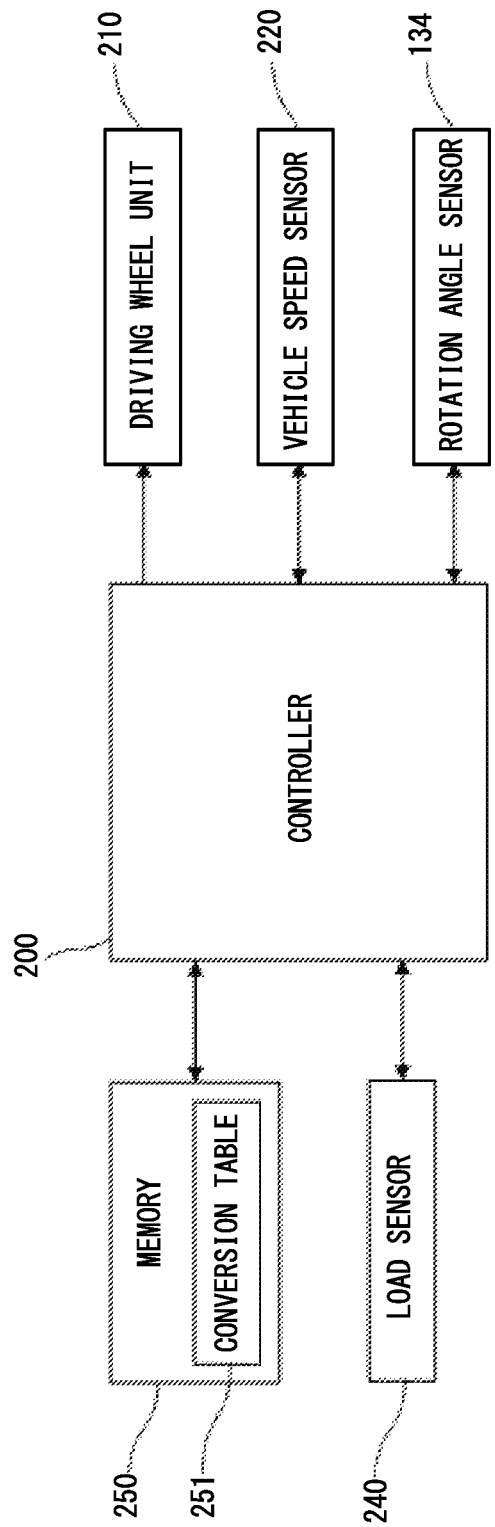
FIG. 6 is a control block diagram of the traveling apparatus.

FIG. 6 is a control block diagram of the traveling apparatus 100. A controller 200 is, for example, a CPU and accommodated inside the body part 122. A driving wheel unit 210 includes a driving circuit and a motor for driving the rear wheels 102, which are driving wheels.

The driving wheel unit 210 is accommodated inside the body part 122. The controller 200 sends driving signals to the driving wheel unit 210 to thereby control the rotations of the rear wheels 102. When the controller 200 sends a driving signal for forwardly rotating the motor to the driving wheel unit 210, the traveling apparatus 100 travels forward. When the controller 200 sends a driving signal for reversely rotating the motor to the driving wheel unit 210, the traveling apparatus 100 travels backward.

The vehicle speed sensor 220 monitors the amount of rotation of the rear wheels 102 or that of the wheel axis 103 and detects the speed of the traveling apparatus 100. The vehicle speed sensor 220 sends, in response to a request from the controller 200, the result of the detection to the controller 200 as a speed signal. The rotation angle sensor 134 detects the rotation angle θ as described above. The rotation angle sensor 134 sends, in response to the request from the controller 200, the result of the detection to the controller 200 as a rotation angle signal.

A load sensor 240 is, for example, a piezoelectric film that detects a load applied on the step 141, and is embedded in the step 141. In response to a request from the controller 200, the load sensor 240 sends the result of the detection as a load signal to the controller 200.

A memory 250 is a non-volatile storage medium and is, for example, a solid state drive. The memory 250 stores not only a control program for controlling the traveling apparatus 100 but also various parameter values, functions, lookup tables, and the like used for the control. The memory 250 stores a conversion table 251 for converting the rotation angle θ into the target speed.

Figure 7:
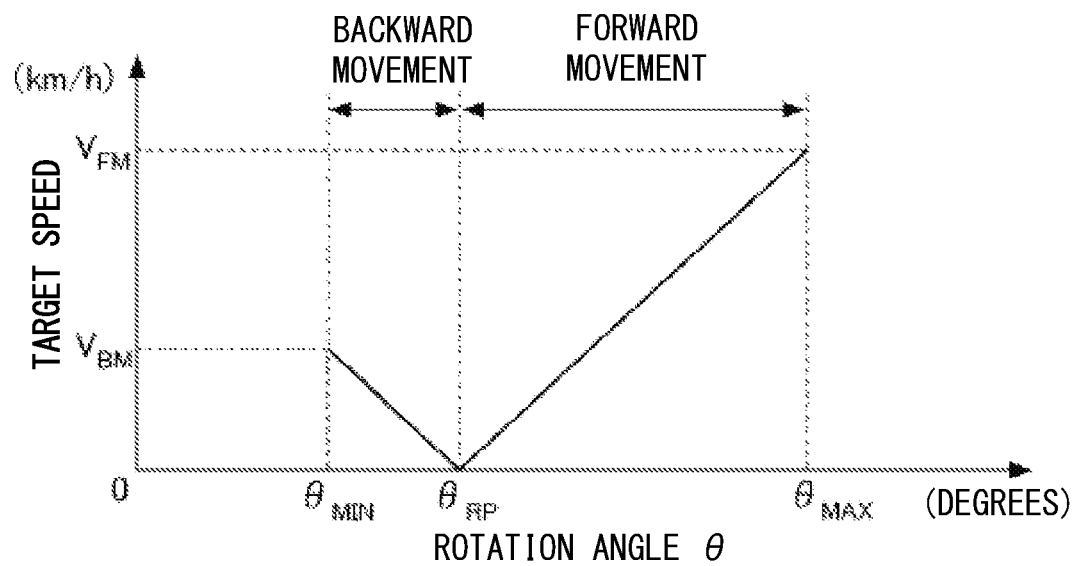
FIG. 7 is a graph showing a relationship between a rotation angle and a target speed.

FIG. 7 is a graph showing a relationship between the rotation angle θ and the target speed as an example of the conversion table 251 for converting the rotation angle θ into the target speed. The horizontal axis indicates the rotation angle θ (degrees) and the vertical axis indicates the target speed (km/h). As shown in FIG. 7, the target speed is expressed as the function of the rotation angle θ. The target speed is expressed by a positive value as a moving distance per unit time regardless of whether the traveling apparatus 100 travels forward or it travels backward.

As stated above, the controller 200 performs backward movement control when the rotation angle θ is in the range between $\theta_{MIN}$ and $\theta_{RP}$. The target speed in this range is expressed by a linear function in which the target speed becomes $V_{BM}$ (km/h) when the rotation angle θ is $\theta_{MIN}$ (degrees) and the target speed becomes 0 (km/h) when the rotation angle θ is $\theta_{RP}$ (degrees). When, for example, the user 900 gradually tilts the handlebar 115 forward from the reference position, the traveling apparatus 100 increases the backward traveling speed so as to follow the target speed.

The controller 200 performs forward movement control when the rotation angle θ is in the range between $\theta_{RP}$ and $\theta_{MAX}$. The target speed in this range is expressed by a linear function in which the target speed becomes 0 (km/h) when the rotation angle θ is $\theta_{RP}$ (degrees) and the target speed becomes $V_{FM}$ (km/h) when the rotation angle θ is $\theta_{MAX}$ (degrees). When, for example, the user 900 gradually tilts the handlebar 115 backward from the reference position, the traveling apparatus 100 increases the forward traveling speed so as to follow the target speed.

As shown in FIG. 7, the maximum speed when the traveling apparatus 100 travels forward is $V_{FM}$ (km/h) and the maximum speed when the traveling apparatus 100 travels backward is $V_{BM}$ (km/h). In view of the traveling efficiency and stability of the posture while the user is mounted on the traveling apparatus 100, $V_{FM}$ is preferably larger than $V_{BM}$, as shown in FIG. 7.

As described above, when the rotation angle θ and the target speed are associated with each other by the function, the conversion table 251 can be described in the form of the function. The conversion table 251 described in the form of the function is stored in the memory 250 and is referred to as appropriate.

When the rotation angle θ is associated with the target speed as described above, the operation of the handlebar 115 that is tilted along the traveling direction corresponds well to the traveling of the traveling apparatus 100 and the instinctive user interface can be achieved as the driving operation. When the user 900 tilts the handlebar 115 so that it becomes closer to the user's body, the traveling apparatus 100 accelerates while traveling forward. On the other hand, when the user 900 returns the handlebar 115 to the reference position, the traveling apparatus 100 gradually decelerates and then stops. When the user 900 further tilts the handlebar 115 so that it is away from the user's body, the traveling apparatus 100 travels backward. When the user 900 further tilts the handlebar 115 so that it is further away from the user's body, the speed of the traveling apparatus 100 increases. When the user 900 returns the handlebar 115 toward the reference position, the traveling apparatus 100 decelerates. As stated above, the user 900 is able to continuously instruct forward traveling, backward traveling, acceleration, deceleration, and stop by a simple and consistent manipulation procedure for manipulating the operation member along the traveling direction.

Figure 8:
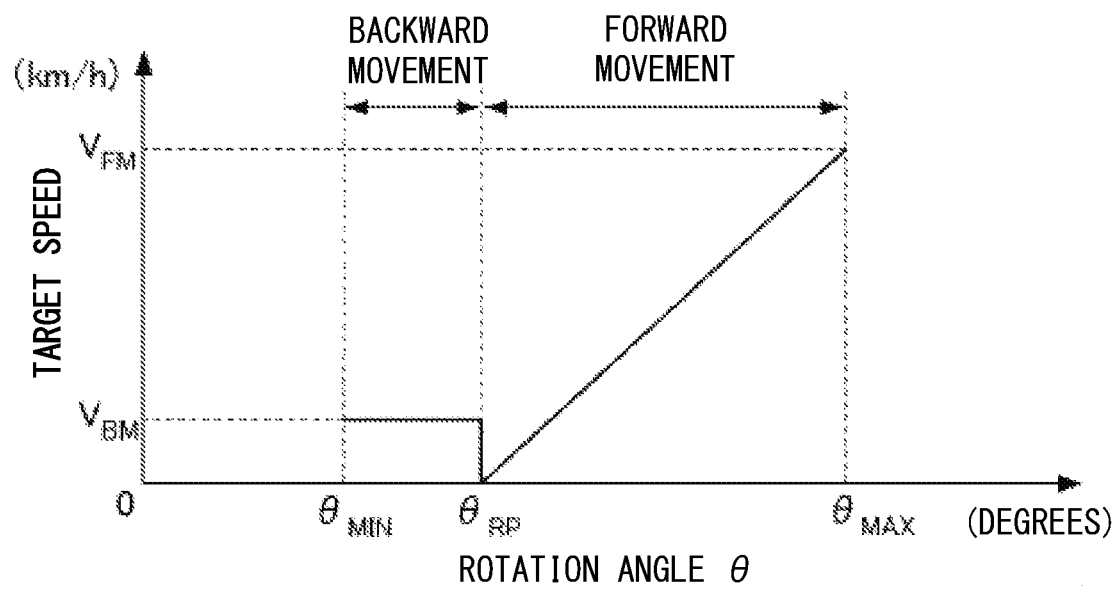
FIG. 8 is a graph showing a relationship between the rotation angle and the target speed according to another example.

FIG. 8 is a graph showing a relationship between the rotation angle θ and the target speed according to another example. Like in FIG. 7, the horizontal axis indicates the rotation angle θ (degrees) and the vertical axis indicates the target speed (km/h). The example shown in FIG. 8 differs from the example shown in FIG. 7 in that the speed is made constant when the traveling apparatus 100 travels backward.

Specifically, in the range between $θ_{MIN}$ and $θ_{RP}$ in which the backward movement control is performed, the target speed is set to the constant value $V_{BM}$ (km/h). According to such a configuration, even when the user 900 gradually tilts the handlebar 115 from the reference position in the forward direction, after the target speed has reached $V_{BM}$, the traveling apparatus 100 travels backward while keeping this speed constant.

When the user 900 moves the traveling apparatus 100 in the backward direction, the user 900 often loses his/her balance as he/she looks back over his/her shoulder and thus may unintentionally move the handlebar 115 forward or backward. Even in such a case, by keeping the speed when the traveling apparatus 100 travels backward constant, the user 900 does not unintentionally increase or decrease the backward traveling speed and thus can easily keep his/her balance.

FIG. 9 is a table showing a relationship between the rotation angle θ and the target speed as another example of the conversion table 251 for converting the rotation angle θ into the target speed. In the example of FIG. 9, the continuously varying rotation angle θ is divided into a plurality of groups and one target speed is associated with each of the plurality of groups. The target speed is expressed by a positive value as a moving distance per unit time regardless of whether the traveling apparatus 100 travels forward or it travels backward.

In this embodiment, the range between $θ_{MIN}$ and $θ_{MAX}$ is divided into six groups. The controller 200 performs backward movement control when the rotation angle θ falls within one of the group between $θ_{MIN}$ or greater and less than $θ_1$ and the group between $θ_1$ or greater and less than $θ_2$, performs stop control when the rotation angle θ falls within the group between $θ_2$ or greater and less than $θ_3$ including $θ_{RP}$, and performs forward movement control when the rotation angle θ falls within one of the group between $θ_3$ or greater and less than $θ_4$, the group between $θ_4$ or greater and less than $θ_5$, and the group between $θ_5$ or greater and equal to or less than $θ_{MAX}$.

As shown in FIG. 9, when the rotation angle θ is between $θ_{MIN}$ or greater and less than $θ_1$, 4.0 (km/h) is associated with the backward traveling target speed. When the rotation angle θ is between $θ_1$ or greater and less than $θ_2$, 2.0 (km/h) is associated with the backward traveling target speed. Further, when the rotation angle θ is between $θ_2$ or greater and less than $θ_3$ including $θ_{RP}$, 0 (km/h) is associated with the target speed. Further, when the rotation angle θ is between $θ_3$ or greater and less than $θ_4$, 5.0 (km/h) is associated with the forward traveling target speed. When the rotation angle θ is between $θ_4$ or greater and less than $θ_5$, 10.0 (km/h) is associated with the forward traveling target speed. When the rotation angle θ is between $θ_5$ or greater and equal to or less than $θ_{MAX}$, 15.0 (km/h) is associated with the forward traveling target speed.

When the rotation angle θ and the target speed are associated with each other for each of the groups that have been divided, the conversion table 251 may be described in the form of a lookup table. The conversion table 251 that is described in the form of the lookup table is stored in the memory 250 and is referred to as appropriate. Like in the above example, when the target speed is associated with somewhat broad ranges of the rotation angles θ, the target speed will not change little by little, for example, as a result of being affected by swinging of the user 900's body, and it is thus expected that the speed will be smoothly changed. It is obvious that hysteresis may be included in the boundaries between the above ranges, and by setting different boundaries of the ranges at the time of acceleration and deceleration, it is expected that the speed will be changed more smoothly.

The association between the rotation angle θ and the target speed is not limited to those in the examples of FIGS. 7 to 9 and various other associations may be formed. For example, the amount of a change in the target speed for the amount of a change in the rotation angle θ may be configured to be small in a low-speed region, while the amount of a change in the target speed for the amount of a change in the rotation angle θ may be configured to be large in a high-speed region. Further, while the conversion table 251 in which the rotation angle θ, which is a parameter, is associated with the target speed is employed in this embodiment since the rotation angle θ corresponds one-to-one to the WB length, a conversion table in which the WB length is associated with the target speed may be employed in accordance with the original intention. In this case, after the rotation angle θ obtained from the rotation angle sensor 134 is converted into the WB length using the aforementioned function, the conversion table may be referred to.

As described above, in the traveling apparatus 100 according to this embodiment, the target speed is associated with the rotation angle θ, and a change in the rotation angle θ by the operation of the user 900 causes the traveling apparatus 100 to accelerate/decelerate in order to reach the target speed associated with the changed rotation angle. In other words, the rotation angle θ is used as a parameter to associate the WB length with the target speed, and when the user 900 adjusts the WB length, the target speed is changed according to the adjusted WB length.

In the forward traveling in which the handlebar 115 is manipulated in the first range, when the rotation angle θ is reduced, the WB length becomes shorter, thereby improving maneuverability. That is, the traveling apparatus 100 can move around in a narrow space. On the contrary, when the rotation angle θ is increased, the WB length becomes longer, thereby improving travel stability, in particular, straight drivability. That is, the traveling apparatus 100 is less susceptible to sway caused by bumps and the like on the road even when traveling at a high speed. As the WB length is changed in conjunction with a change in the speed, the WB length will not be long when the traveling apparatus 100 is traveling at a low speed, and thus the traveling apparatus 100 can move in a projected area minimal at the low speed. That is, an area on the road necessary for the traveling apparatus 100 to travel in is small without requiring an excess area. In the backward traveling in which the handlebar 115 is manipulated in the second range, the rotation angle θ is small and the WB length is short, whereby the traveling apparatus 100 can easily make turns even in a narrow space.

Figure 10:
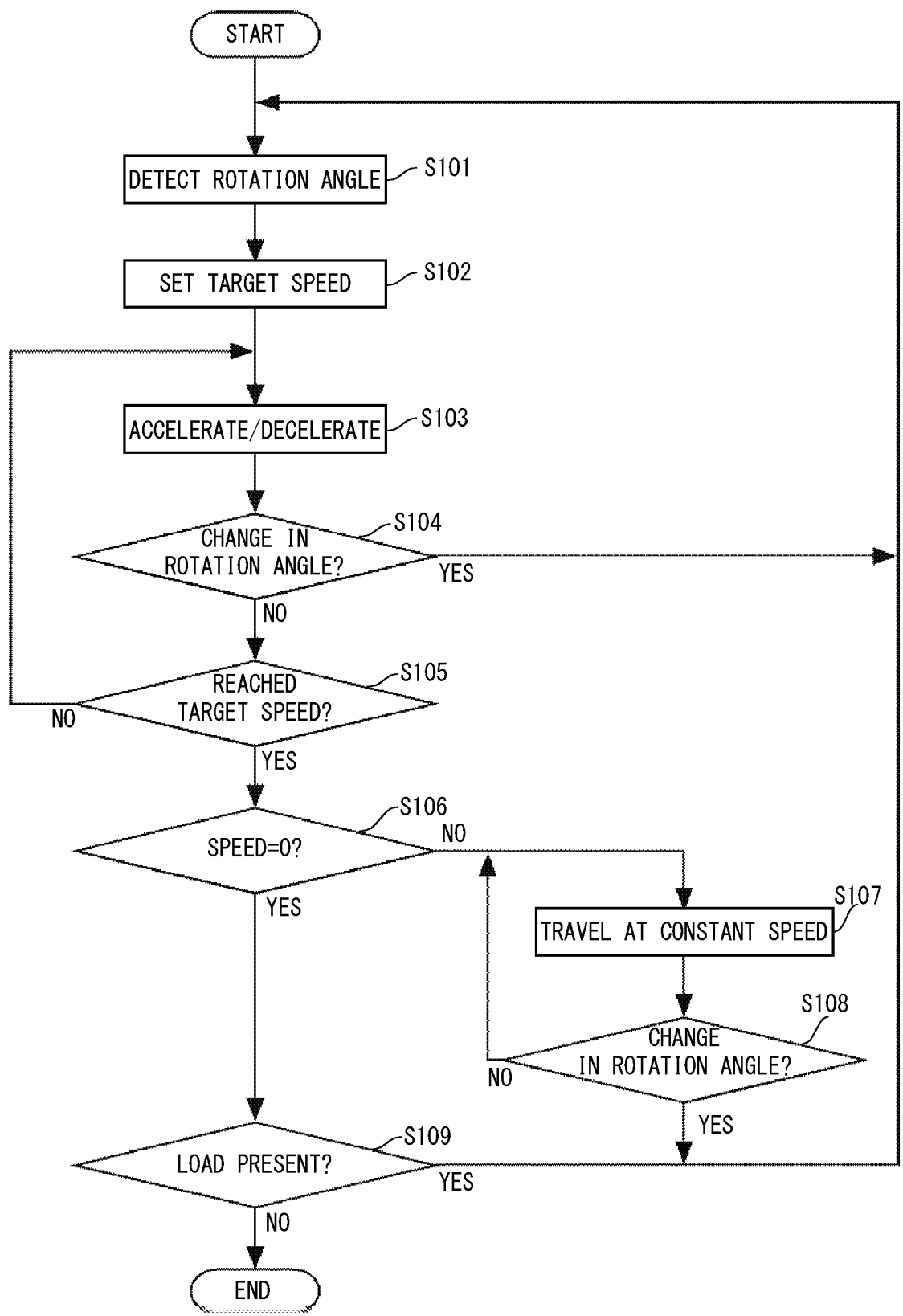
FIG. 10 is a flowchart showing a process while the traveling apparatus is traveling.

Next, a traveling process according to this embodiment will be described. FIG. 10 is a flowchart showing a process while the traveling apparatus is traveling. The flow starts when a power switch is turned on and a signal indicating a load is present is received from the load sensor 240, i.e., when the user 900 rides on the traveling apparatus 100.

In Step S101, the controller 200 obtains the rotation angle signal from the rotation angle sensor 134 to calculate the current rotation angle θ. Further, in Step S102, the calculated rotation angle θ is applied to the conversion table 251, which has been read out from the memory 250, to set the traveling direction (forward traveling or backward traveling) and the target speed.

When the controller 200 sets the traveling direction and the target speed, it proceeds to Step S103, where the controller 200 sends the driving signals of acceleration/deceleration to the driving wheel unit 210. Specifically, the controller 200 first receives the speed signal from the vehicle speed sensor 220 and checks the current traveling direction and the current speed. When the traveling direction is the same, the driving signal for acceleration is sent to the driving wheel unit 210 if the target speed is larger than the current speed and the driving signal for deceleration is sent to the driving wheel unit 210 if the target speed is smaller than the current speed.

When the handlebar 115 is displaced from the first range to the second range or from the second range to the first range and the traveling direction is reversed, the controller 200 temporarily stops sending the driving signals. After the controller 200 receives a speed signal of speed 0 from the vehicle speed sensor 220, the controller 200 sends the driving signal for acceleration in the reversed traveling direction to the driving wheel unit 210. That is, by reversing the traveling direction after at least one of the front wheel and the rear wheels is stopped, the traveling direction is smoothly reversed without applying a load to the driving system.

The controller 200 monitors whether or not the rotation angle θ has been changed during acceleration or deceleration, that is, whether or not the user 900 has tilted the handlebar 115 forward or backward (Step S104). If the controller 200 determines that the rotation angle θ has been changed, it starts the process from Step S101 again. If the controller 200 determines that the rotation angle θ has not been changed, it proceeds to Step S105. Note that when the conversion table shown in FIG. 9 is employed, if changes in the rotation angle θ are within one range, it is determined that the rotation angle θ has not been changed.

In Step S105, the controller 200 receives the speed signal from the vehicle speed sensor 220 and evaluates as to whether or not the current speed has reached the target speed. If the controller 200 determines that the current speed has not reached the target speed, it returns to Step S103, and the acceleration or deceleration is continued. If the controller 200 determines that the current speed has reached the target speed, it proceeds to Step S106. In Step S106, the controller 200 checks whether or not the target speed is zero. If the target speed is zero, it means that the traveling apparatus 100 is stopped at the time of Step S106. Otherwise, the traveling apparatus 100 is traveling at the target speed, and thus the controller 200 sends, to the driving wheel unit 210, the driving signal for maintaining the traveling apparatus 100 to travel at the speed (Step S107).

Even while the traveling apparatus 100 is traveling at a constant speed in Step S107, the controller 200 monitors whether or not the rotation angle θ has been changed, that is, whether or not the user 900 has tilted the handlebar 115 forward or backward (Step S108). If the controller 200 determines that the rotation angle θ has been changed, it returns to Step S101. If the controller 200 determines that the rotation angle θ has not been changed, it returns to Step S107 to continue traveling at the constant speed.

If the controller 200 confirms that the target speed is zero in Step S106, it proceeds to Step S109 and evaluates whether the user 900 gets off the traveling apparatus 100 based on the load signal received from the load sensor 240. If the controller 200 determines that the user 900 has not got off the traveling apparatus 100, i.e., determines that a load is present, it returns to Step S101 to continue the travel control. If the controller 200 determines that the user 900 has got off the traveling apparatus 100, a series of operations is ended.

Figure 11:
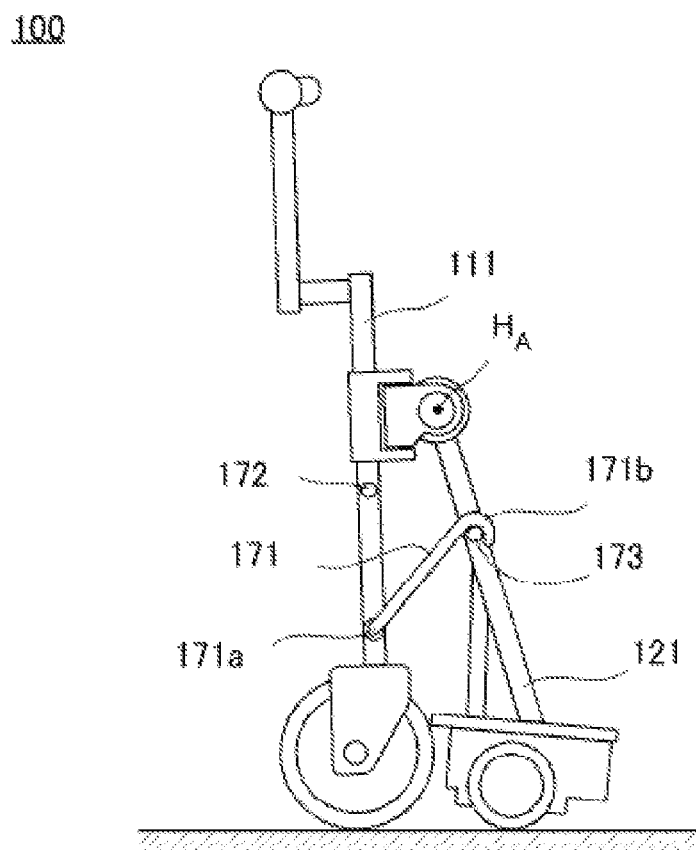
FIG. 11 is a diagram for describing a first optional feature of the traveling apparatus.

Next, some optional features that the traveling apparatus 100 may have will be described. FIG. 11 is a diagram for describing the first optional feature of the traveling apparatus 100. The traveling apparatus 100 includes, as the first optional feature, a securing mechanism for maintaining the WB length to be a length shorter than the reference wheel base length $WB_{RP}$ when the traveling apparatus 100 is not being used.

The securing mechanism includes a securing bar 171 and two projections 172 and 173. The securing bar 171 includes a pivotally supported part 171a provided on the base end side and rotatably supported by the front pole 111 and a hook 171b that is provided on the tip end side and is secured by the projections 172 and 173.

The projection 172 is provided in the front pole 111. In order to prevent a situation in which the presence of the securing bar 171 hinders the use of the traveling apparatus 100, the hook 171b is secured to the projection 172 and the securing bar 171 is fixed to the front pole 111. The projection 173 is provided in the rear pole 121. In order to prevent a situation in which the front pole 111 and the rear pole 121 are rotated relative to each other while the traveling apparatus 100 is not being used, the hook 171b is secured to the projection 173 and the securing bar 171 is suspended between the front pole 111 and the rear pole 121. According to such a securing mechanism, the traveling apparatus 100 can be compactly folded and easily carried when it is not being used.

Figure 12A:
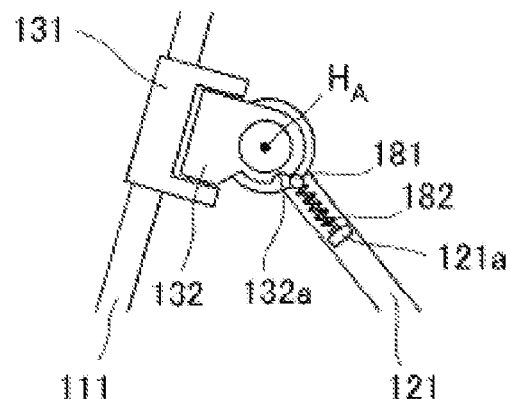
FIGS. 12A and 12B are diagrams for describing a second optional feature of the traveling apparatus.
Figure 12B:
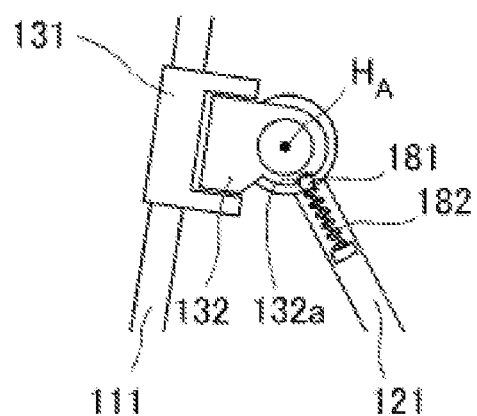

FIG. 12 is a diagram for describing the second optional feature of the traveling apparatus 100. The traveling apparatus 100 includes, as the second optional feature, a resistance mechanism that provides a feeling of resistance for the manipulation for displacing the handlebar 115 from the reference position to the second range and the manipulation for displacing the handlebar 115 from the reference position to the first range by the user 900 as an operational feeling of the user 900. The resistance mechanism is provided around the hinge axis $H_A$.

FIG. 12(*a*) is an enlarged diagram of a part of the traveling apparatus 100 around the hinge axis $H_A$ and shows a state of the resistance mechanism when the handlebar 115 is operated in the first range. The resistance mechanism includes a recessed part 132*a* provided in the hinge joint 132, a pressing ball 181, a pressing spring 182, and a guide 121*a* provided in the rear pole 121. The guide 121*a* is a guiding element that guides the pressing ball 181 and the pressing spring 182 in such a way that they slide along the direction in which they act, only a part of the guide 121*a* being shown in order to clearly show the state of the pressing ball 181 and that of the pressing spring 182.

When the front pole 111 and the rear pole 121 are rotated relative to each other about the hinge axis $H_A$, the hinge joint 132, together with the pivot joint 131, is integrally rotated with the front pole 111, and the pressing ball 181 and the pressing spring 182 are integrally rotated with the rear pole 121. Therefore, when the handlebar 115 is manipulated in the first range, the pressing ball 181 is pressed against the edge side surface of the hinge joint 132 due to the action by the pressing spring 182 and is relatively slid on the edge side surface when the pivot joint 131 is rotated.

When the handlebar 115 is manipulated in the second range, similar to the case in which the handlebar 115 is manipulated in the first range, the pressing ball 181 is pressed against the edge side surface of the hinge joint 132 due to the action by the pressing spring 182 and is relatively slid on the edge side surface when the pivot joint 131 is rotated.

FIG. 12(*b*) is also an enlarged diagram of a part of the traveling apparatus 100 around the hinge axis $H_A$, similar to FIG. 12(*a*), and shows a state of the resistance mechanism when the handlebar 115 is located at the reference position. As shown in FIG. 12(*b*), when the handlebar 115 is located at the reference position, i.e., when the traveling apparatus 100 is in the reference state, the pressing ball 181 is pressed by the pressing spring 182 and falls into the recessed part 132*a* of the hinge joint 132.

Since the pressing spring 182 is compressed when the handlebar 115 is manipulated and the pressing ball 181 rides on the edge side surface from the recessed part 132*a*, such a resistance mechanism provides resistance for the handlebar manipulation. That is, a force for keeping the traveling apparatus 100 so that it is in the reference state is applied and an additional operational force to compress the pressing spring 182 is needed for the manipulation for displacing the handlebar 115 from the reference position to the second range and the manipulation for displacing the handlebar 115 from the reference position to the first range. In other words, the resistance mechanism provides a feeling of resistance for these manipulations as the operational feeling of the user 900.

With such an effect, it is expected that the frequency of the handlebar 115 being unintentionally manipulated beyond the reference position will be reduced and it is possible to prevent the traveling direction from being reversed contrary to the user's desire. While the aforementioned resistance mechanism has provided resistance for the manipulation for displacing the handlebar 115 from the reference position to the second range and the manipulation for displacing the handlebar 115 from the reference position to the first range, resistance may be provided only for one of the aforementioned two types of manipulations. In this case, in order to prevent a situation in which the traveling apparatus 100 travels backward contrary to the user's desire, it is preferable to provide resistance for the manipulation for displacing the handlebar 115 from the reference position to the second range. If resistance is not provided for one of the two types of manipulations, the bump of the corresponding recessed part 132*a* may be made flat.

Figure 13:
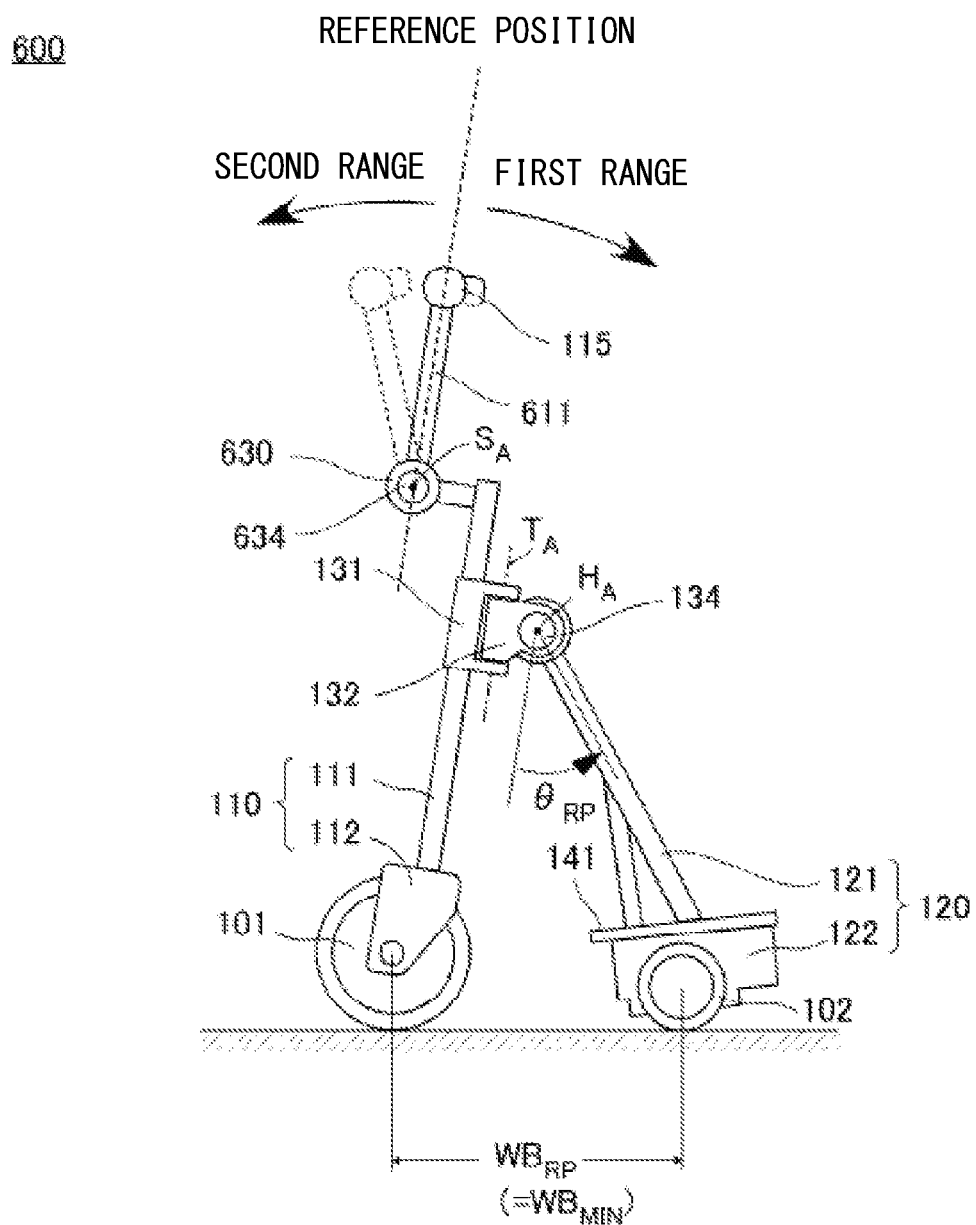
FIG. 13 is a diagram for describing a reference state of a traveling apparatus according to a second embodiment.

Next, a second embodiment will be described. FIG. 13 is a diagram for describing a reference state of a traveling apparatus 600 according to the second embodiment. The traveling apparatus 600 is mainly different from the traveling apparatus 100 in that the handlebar 115 is tilted with respect to the front pole 111 in the second range. The elements that have the functions similar to those of the traveling apparatus 100 are denoted by the same reference symbols as those of the first embodiment and the descriptions thereof will be omitted. Further, the configurations of the control block of the traveling apparatus 600 and the process flow thereof are also substantially the same as those of the traveling apparatus 100. Accordingly, in the following descriptions, the difference between the traveling apparatus 600 and the traveling apparatus 100 will be described.

The traveling apparatus 600 includes a tilting mechanism 630 that tilts the handlebar 115 around a tilting axis $S_A$ parallel to the hinge axis $H_A$ when the user 900 tilts the handlebar 115 forward (second range) from the reference position. The handlebar 115 is fixed to one end of a handlebar pole 611 and the other end of the handlebar pole 611 is rotatably supported by the tilting mechanism 630. When the user 900 tilts the handlebar 115 backward (first range) from the reference position, a lock (not shown) included in the tilting mechanism 630 acts and the handlebar pole 611 and the front pole 111 are integrated with each other, and the handlebar pole 611 is integrally rotated with the front pole 111 about the hinge axis $H_A$.

In the traveling apparatus 600, the reference rotation angle $\theta_{RP}$ is the minimum angle $\theta_{MIN}$ and the reference wheel base length $WB_{RP}$ is the shortest length $WB_{MIN}$. The WB length is adjusted with respect to the manipulation of the handlebar 115 in the first range. The adjusting mechanism maintains $WB_{RP}$ (=$WB_{MIN}$) corresponding to the reference state when the handlebar 115 is operated in the second range.

When the handlebar 115 which is in the first range is gradually tilted forward, the rotation angle θ becomes gradually smaller and the WB length becomes smaller before the handlebar 115 reaches the reference position, similar to the traveling apparatus 100. When the handlebar 115 reaches the reference position, the front pole 111 cannot rotate about the hinge axis $H_A$ any more and the lock of the handlebar pole 611 and the front pole 111 is released. When the handlebar 115 exceeds the reference position, the WB length remains $WB_{MIN}$ and the handlebar pole 611 is tilted about the tilting axis $S_A$ with respect to the front pole 111. The tilting angle about the tilting axis $S_A$ of the handlebar pole 611 is detected by a tilting angle sensor 634 disposed near the tilting axis $S_A$.

The tilting angle sensor 634 is, for example, a rotary encoder. An output from the tilting angle sensor 634 is sent to the controller 200.

The tilting mechanism 630 includes a biasing spring that biases the handlebar pole 611 to return the handlebar pole 611 back to the reference position. Therefore, when the user 900 displaces the handlebar 115 from the reference position to the second range, the user 900 manipulates the handlebar 115 against the biasing force of the biasing spring. Due to the action by the biasing spring, it can be expected to prevent the traveling apparatus 600 from traveling backward contrary to the user's desire.

Figure 14:
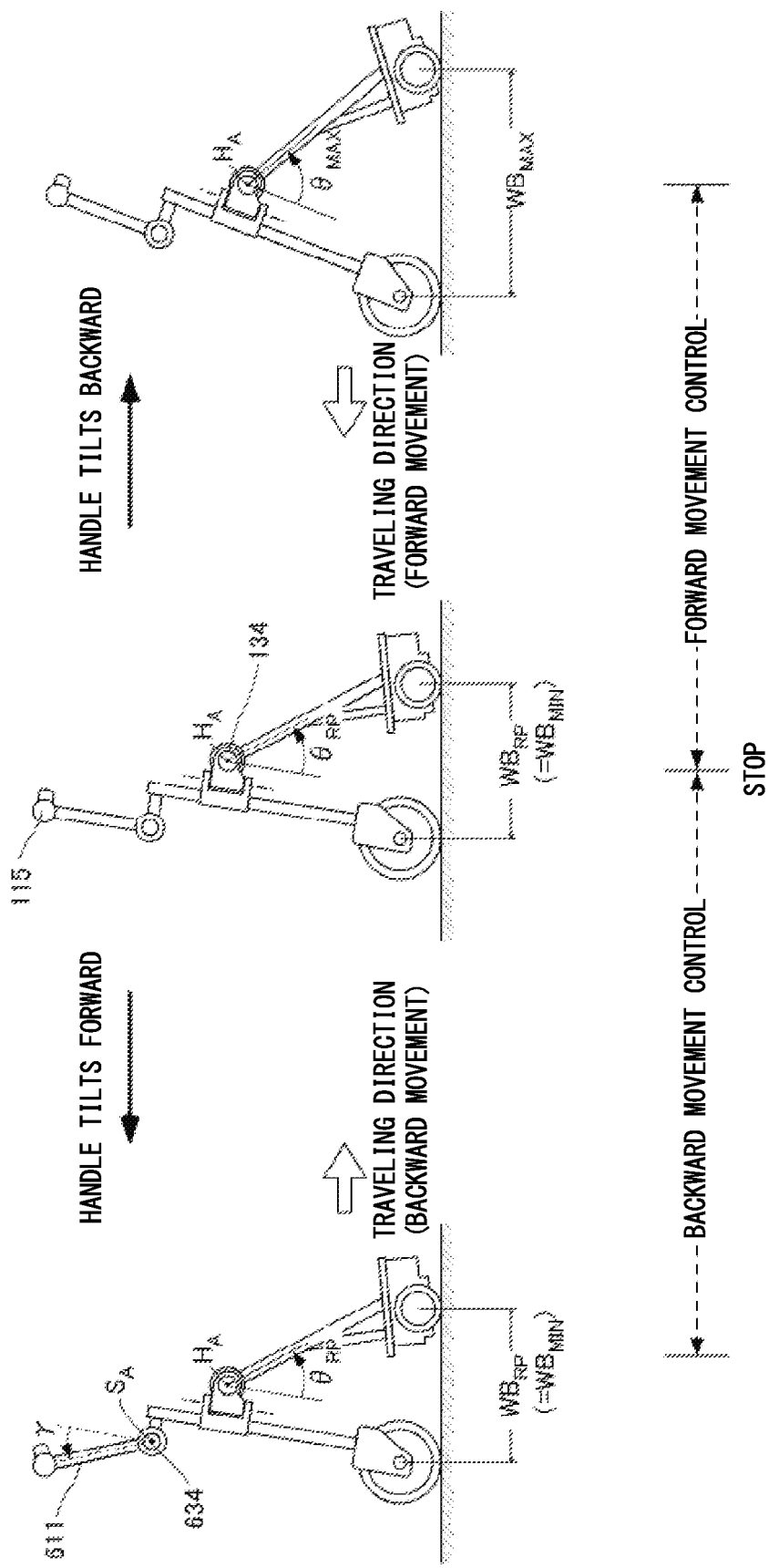
FIG. 14 is a diagram for describing changes in a state of the traveling apparatus and control.

FIG. 14 is a diagram for describing changes in the state of the traveling apparatus 600 and the control. While FIG. 14 is an explanatory diagram similar to FIG. 5, since the WB length becomes the shortest in the reference state in the traveling apparatus 600, even when the handlebar is tilted forward from the reference state, the rotation angle θ remains $θ_{RP}$ and the WB length remains $WB_{RP}$.

Similar to the traveling apparatus 100, the traveling apparatus 600 according to this example travels forward when the user 900 tilts the handlebar 115 backward from the reference position and manipulates the handlebar 115 in the first range and travels backward when the user 900 tilts the handlebar 115 forward from the reference position and manipulates the handlebar 115 in the second range. The traveling apparatus 600 stops when it is in the reference state. However, the traveling apparatus 600 determines the forward traveling target speed according to the rotation angle θ by referring to the output of the rotation angle sensor 134 when the forward movement control is performed and determines the backward traveling target speed according to the tilting angle γ by referring to the output of the tilting angle sensor 634 when the backward movement control is performed. When the rotation angle θ is $θ_{RP}$ and the tilting angle γ is 0 (=the angle when the handlebar pole 611 is integrated with the front pole 111), such a control is performed as to stop the traveling apparatus 600. Specific forward movement control, backward movement control, and stop control executed by the controller 200 will be described later.

Figure 15A:
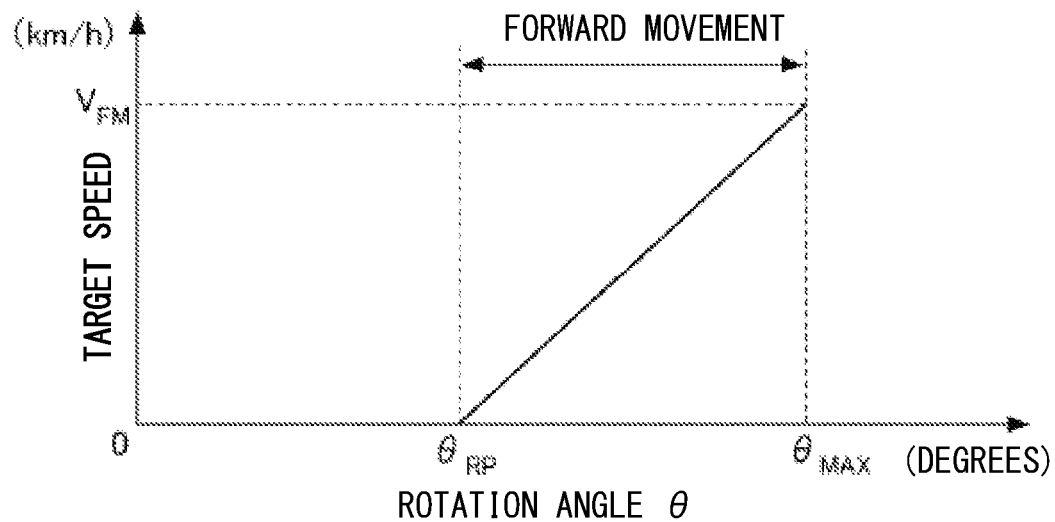
FIGS. 15A and 15B are graphs showing a relationship between the rotation angle and a tilting angle, and the target speed.
Figure 15B:
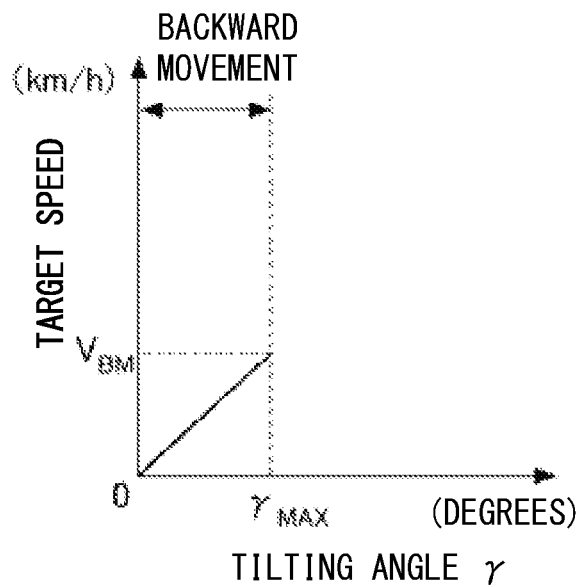

FIG. 15 is a graph showing a relationship between the rotation angle θ and the tilting angle γ, and the target speed. FIG. 15(a) is a graph showing a relationship between the rotation angle θ and the target speed used for forward movement control and FIG. 15(b) is a graph showing a relationship between the tilting angle γ and the target speed used for backward movement control. The horizontal axis indicates the rotation angle θ (degrees) or the tilting angle γ (degrees) and the vertical axis indicates the target speed (km/h). The target speed is expressed by a positive value as a moving distance per unit time regardless of whether the traveling apparatus 600 travels forward or the traveling apparatus 600 travels backward.

The controller 200 performs forward movement control when the rotation angle θ is in the range between $θ_{RP}$ and $θ_{MAX}$. The target speed in this range is expressed by a linear function in which the target speed becomes 0 (km/h) when the rotation angle θ is $θ_{RP}$ (degrees) and it becomes $V_{FM}$ (km/h) when the rotation angle θ is $θ_{MAX}$ (degrees). When, for example, the user 900 gradually tilts the handlebar 115 backward from the reference position, the traveling apparatus 600 increases the forward traveling speed so as to follow the target speed. The output of the tilting angle sensor 634 when the forward movement control is performed is γ=0.

The controller 200 performs backward movement control when the tilting angle γ is in the range between 0 and $γ_{MAX}$. The target speed in this range is expressed by a linear function in which the target speed becomes $V_{BM}$ (km/h) when the tilting angle γ is $γ_{MAX}$ (degrees) and the target speed becomes 0 (km/h) when the tilting angle γ is 0 (degree). When, for example, the user 900 gradually tilts the handlebar 115 forward from the reference position, the traveling apparatus 600 increases the backward traveling speed so as to follow the target speed. The output of the rotation angle sensor 134 when the backward movement control is performed is $θ=θ_{RP}$.

By associating the rotation angle θ and the tilting angle γ with the target speed as described above, the operation of the handlebar 115 that is tilted along the traveling direction corresponds well to the traveling of the traveling apparatus 600 and the instinctive user interface can be achieved as the driving operation. As the user 900 tilts the handlebar 115 so that it becomes closer to the user's body, the traveling apparatus 600 accelerates while traveling forward. On the other hand, when the user 900 returns the handlebar 115 to the reference position, the traveling apparatus 600 gradually decelerates and then stops. When the user 900 further tilts the handlebar 115 so that it is away from the user's body, the traveling apparatus 600 travels backward. When the user 900 further tilts the handlebar 115 so that it is further away from the user's body, the speed of the traveling apparatus 600 increases. When the user 900 returns the handlebar 115 toward the reference position, the traveling apparatus 600 decelerates. In this way, the user 900 is able to continuously instruct forward traveling, backward traveling, acceleration, deceleration, and stop by a simple and consistent manipulation procedure for manipulating the operation member along the traveling direction.

Figure 16A:
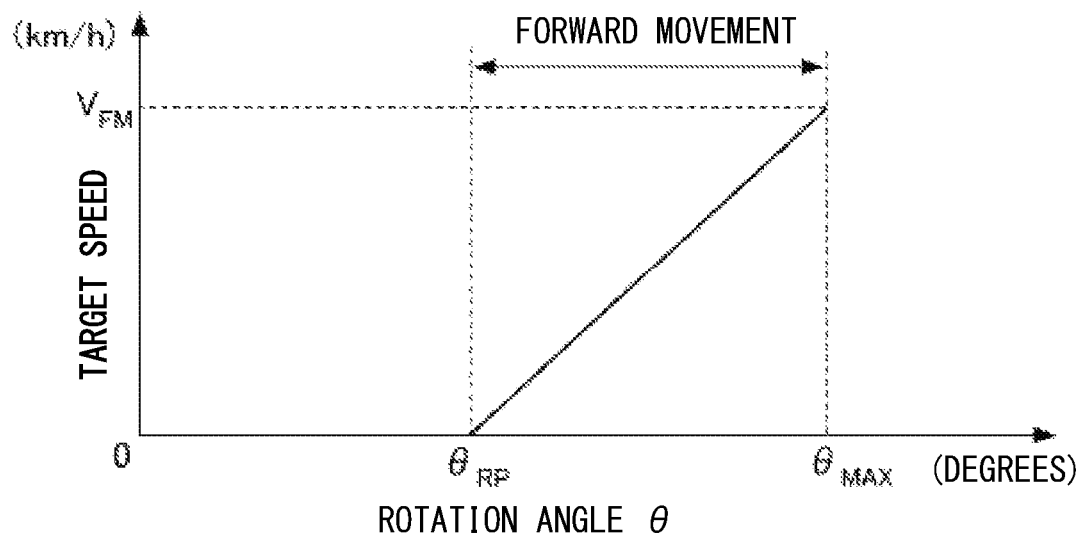
FIGS. 16A and 16B are graphs showing a relationship between the rotation angle and the tilting angle, and the target speed according to another example.
Figure 16B:
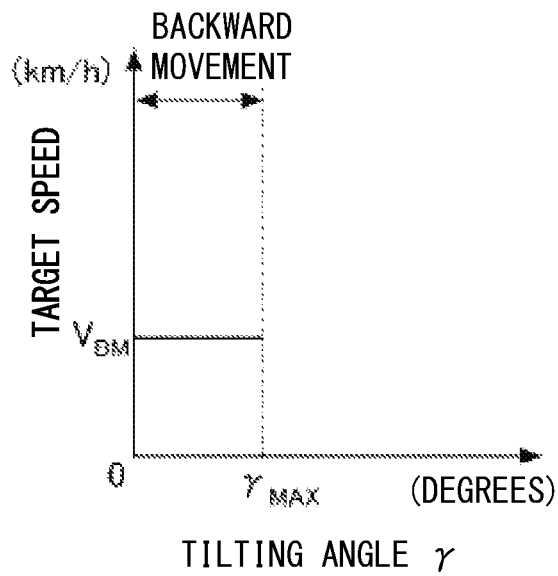

FIG. 16 is a graph showing a relationship between the rotation angle θ and the tilting angle γ, and the target speed according to another example. Similar to FIG. 15, in FIG. 16, the horizontal axis indicates the rotation angle θ (degrees) or the tilting angle γ (degrees) and the vertical axis indicates the target speed (km/h). The example shown in FIG. 16 differs from the example shown in FIG. 7 in that the speed is made constant when the traveling apparatus travels backward.

Specifically, in the range in which the tilting angle γ is between 0 and $γ_{MAX}$, the target speed is set to the constant value $V_{BM}$ (km/h). According to such a configuration, even when the user 900 gradually tilts the handlebar 115 from the reference position in the forward direction, after the target speed has reached $V_{BM}$, the traveling apparatus 600 travels backward while keeping this speed constant.

When the user 900 moves the traveling apparatus 600 in the backward direction, the user 900 often loses his/her balance as he/she looks back over his/her shoulder and thus may unintentionally move the handlebar 115 forward or backward. Even in such a case, by keeping the speed when the traveling apparatus 600 travels backward constant, the user 900 does not unintentionally increase or decrease the backward traveling speed and thus can easily keep his/her balance.

The traveling process of the traveling apparatus 600 is substantially similar to the traveling process of the traveling apparatus 100 described with reference to FIG. 10. The processing regarding the rotation angle θ in the traveling process of the traveling apparatus 100 may be replaced by the processing regarding the rotation angle θ and the tilting angle γ. That is, the controller 200 may refer to the output of the tilting angle sensor 634 as well as the output of the rotation angle sensor 134, determine whether the user 900 is manipulating the handlebar 115 in the first range or in the second range, and perform travel control in accordance with the determination.

Further, the optional feature described with reference to FIG. 12 may be applied to the traveling apparatus 600 as well. In order to cause the user 900 to feel a feeling of resistance when displacing the handlebar 115 from the reference position to the second range, the resistance mechanism may be provided around the tilting axis $S_A$. The resistance mechanism is not limited to a mechanism that uses a pressing ball and various mechanisms may be employed as the resistance mechanism. Another mechanism such as the one that uses a plate spring is, for example, known.

Although the embodiments have been described above with reference to the examples, the front and rear wheels may not be wheels and may be ground-contacting elements such as spherical wheels, a crawler, or the like. Further, a power source for driving the driving wheels is not limited to a motor and instead may be a gasoline engine or the like. Moreover, the adjusting mechanism is not limited to a mechanical mechanism that adjusts the wheel base length using the force of the operation by the user who operates the operation member and may be a mechanism adjusted by an actuator. The operation member manipulated by the user may not be a handlebar as long as the operation member has a reference position and can be displaced to the first range, which is on one side with respect to the reference position and to the second range, which is on another side with respect to the reference position. Besides the handlebar for steering, a lever, a slide switch or the like may be, for example, provided. In this case, when the user displaces the operation member in the direction away from the reference position in the first range, the adjusting mechanism increases the wheel base length and the traveling apparatus travels forward, and when the user displaces the operation member in the second range, the traveling apparatus travels backward, whereby the instinctive user interface can be achieved as the driving operation. When the direction in which the operation member is manipulated is along the traveling direction, in particular, more instinctive operational feeling can be expected.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling apparatus including at least, with respect to a traveling direction, a front wheel and a rear wheel and on which a user rides when traveling, the traveling apparatus comprising:
a driving unit configured to drive at least one of the front wheel and the rear wheel;
an operation member configured to be displaced to a first range which is on one side with respect to a reference position and is away from the traveling direction that is forward or backward and a second range which is on another side with respect to the reference position, the operation member being a handle that the user holds;
an adjusting mechanism configured to adjust a wheel base length between the front wheel and the rear wheel in such a way that the wheel base length is increased when the user displaces the operation member in a direction away from the reference position in the first range; and
a controller configured to control, when the user manipulates the operation member in the first range, the driving unit in such a way that the traveling apparatus travels forward based on a forward movement target speed that has been made to become larger as the wheel base length increases,
wherein the adjusting mechanism adjusts the wheel base length by changing a relative position of a front wheel supporting member supporting the front wheel and a rear wheel supporting member supporting the rear wheel by rotating the front wheel supporting member and the rear wheel supporting member around a hinge axis of a hinge joint, the hinge joint being disposed between an end of the front wheel supporting member at which the front wheel is supported and an end of the operation member at which the operation member is supported, by an operation force of the user manipulating the operation member, and
wherein the controller controls the driving unit in such a way that the traveling apparatus travels backward when the user manipulates the operation member in the second range.

2. The traveling apparatus according to claim 1, wherein the adjusting mechanism adjusts, when the user displaces the operation member in a direction away from the reference position in the second range, the wheel base length between the front wheel and the rear wheel in such a way that the wheel base length becomes shorter, and
the controller controls, when the user manipulates the operation member in the second range, the driving unit in such a way that the traveling apparatus travels backward based on a backward movement target speed that has been made to become larger as the wheel base length becomes shorter.

3. The traveling apparatus according to claim 2, comprising a return mechanism configured to return the wheel base length to a reference length corresponding to the reference position when the user does not manipulate the operation member to displace the operation member in the first range or the second range.

4. The traveling apparatus according to claim 3, comprising a securing mechanism configured to keep the wheel base length so that it is a length smaller than the reference length when the traveling apparatus is not being used.

5. The traveling apparatus according to claim 1, wherein the adjusting mechanism adjusts, when the user displaces the operation member in a direction away from the reference position in the second range, the wheel base length between the front wheel and the rear wheel in such a way that the wheel base length becomes shorter, and
the controller controls, when the user manipulates the operation member in the second range, the driving unit in such a way that the traveling apparatus travels backward at a predetermined speed regardless of the wheel base length.

6. The traveling apparatus according to claim 1, wherein the adjusting mechanism maintains the wheel base length corresponding to the reference position when the user displaces the operation member in the second range, and
the controller controls, when the user manipulates the operation member in the second range, the driving unit in such a way that the traveling apparatus travels backward based on a backward movement target speed that has been made to become larger as the degree of manipulation of the operation member from the reference position becomes larger.

7. The traveling apparatus according to claim 1, wherein the adjusting mechanism maintains the wheel base length corresponding to the reference position when the user displaces the operation member in the second range, and the controller controls the driving, unit in such a way that the traveling apparatus travels backward at a predetermined speed when the user manipulates the operation member in the second range.

8. The traveling apparatus according to claim 1, wherein the adjusting mechanism changes the relative position of the front wheel supporting member that supports the front wheel and the rear wheel supporting member that supports the rear wheel by the operational force of the user who manipulates the operation member, to thereby adjust the wheel base length.

9. The traveling apparatus according to claim 1, comprising a resistance mechanism configured to provide a feeling of resistance for a manipulation in which the user displaces the operation member from the reference position to the second range as an operational feeling of the user.

10. The traveling apparatus according to claim 1, wherein the controller drives, when the operation member has been displaced from the first range to the second range, the driving unit in such a way that the traveling apparatus travels backward after at least one of the front wheel and the rear wheel is stopped.

* * * * *